US006846009B2

United States Patent
Kuroe et al.

(10) Patent No.: US 6,846,009 B2
(45) Date of Patent: Jan. 25, 2005

(54) AIRBAG APPARATUS FOR A COMPACT VEHICLE

(75) Inventors: Takeshi Kuroe, Saitama (JP); Satoshi Iijima, Saitama (JP); Akiko Tanaka, Saitama (JP); Takenori Yamamoto, Saitama (JP); Hideo Namiki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 65 days.

(21) Appl. No.: 10/366,336

(22) Filed: Feb. 14, 2003

(65) Prior Publication Data

US 2004/0017066 A1 Jan. 29, 2004

(30) Foreign Application Priority Data

Feb. 20, 2002 (JP) ...................................... 2002-043806
Feb. 20, 2002 (JP) ...................................... 2002-043807

(51) Int. Cl.[7] ............................................. B60R 21/22
(52) U.S. Cl. .................................... 280/730.1; 180/219
(58) Field of Search ........................... 280/730.1, 728.1; 180/219

(56) References Cited

U.S. PATENT DOCUMENTS 6,007,090 A    12/1999   Hosono et al.
6,113,133 A    9/2000    Iijima et al.

FOREIGN PATENT DOCUMENTS

| DE | 100 04 307 A1 | 8/2001 |
| DE | 100 65 894 A1 | 5/2002 |
| DE | 101 06 437 A1 * | 8/2002 |
| JP | 09-328053 A | 12/1997 |
| JP | 9-328087 A * | 12/1997 |
| JP | 2001-219884 A | 8/2001 |

OTHER PUBLICATIONS

Patent Abstracts of Japan, Publication No. 2001219884, Aug. 14, 2001, "Air Bag Device for Saddle Riding Vehicle," Tanaka Mare (Yamaha Motor Co. Ltd.).

* cited by examiner

*Primary Examiner*—Ruth Ilan
(74) *Attorney, Agent, or Firm*—Birch, Stewart, Kolasch & Birch, LLP

(57) ABSTRACT

In a compact vehicle including a pipe stem to be inserted into a head pipe wherein the pipe stem is rotatably supported by the head pipe located at the front end on a vehicle body frame. A front fork is provided for rotatably supporting a front wheel being to a top bridge and a bottom bridge secured at the upper and lower ends of the pipe stem. A steering handle is mounted on the top bridge. To simplify the configuration of the airbag and simplifying the connection between the inflator and the airbag is supported on the steering handle and the inflator for supplying gas for inflation and deployment is stored in the pipe stem.

15 Claims, 9 Drawing Sheets

AIRBAG APPARATUS FOR A COMPACT VEHICLE

CROSS-REFERENCE TO RELATED APPLICATIONS

The present nonprovisional application claims priority under 35 USC 119 to Japanese Patent Application No. 2002-043807 filed on Feb. 20, 2002 and Japanese Patent Application No. 2002-043806 filed on Feb. 20, 2002 the entire contents thereof are hereby incorporated by reference.

BACKGROUND OF THE INVENTION

1. Field of the Invention

The present invention relates to a compact vehicle including a pipe stem to inserted into a head pipe which is rotatably supported by the head pipe and located at the front end on a vehicle body frame. A front fork is provided for rotatably supporting a front wheel connected to a top bridge and a bottom bridge secured at the upper and lower ends of the pipe stem and projecting from the upper and lower ends of the aforementioned head pipe. A steering handle is mounted on the aforementioned top bridge. More specifically, the present invention is directed to an improved layout of an airbag apparatus to be mounted on a compact vehicle.

2. Description of Background Art

Hithertofore, for example, in a motorcycle as disclosed in JP-A-2001-219884, an airbag in the folded state is disposed between the steering handle and the wind-shielding member to be disposed ahead of the steering handle.

However, according to the related art described above, the airbag has to be inflated and deployed to wraparound the steering handle from the front to the rear. Thus, the configuration of the airbag is obliged to be complicated, and the arrangement of the members that may hinder inflation and deployment of the airbag in the vicinity of the steering handle must be avoided. Therefore, whereby the flexibility of parts for the arrangement around the steering handle is reduced.

In order to solve such a problem, it is conceivable to support the airbag by the top bridge or by the steering handle. However, it is difficult to secure a space for disposing an inflator for supplying gas into the airbag in the top bridge or in the steering handle. Although mounting the inflator on the vehicle body frame is conceivable, since the top bridge and the steering handle rotate with respect to the vehicle frame, the structure of connection between the airbag and the inflator is obliged to be complicated.

In addition, a motorcycle having an airbag apparatus mounted thereon is disclosed in JP-A-9-328053.

However, according to the related art described above, the airbag apparatus is disposed between a fuel tank and a seat located behind the fuel tank, and thus it is necessary to downsize the fuel tank in order to secure a space for installing the airbag apparatus. In the case of motorcycles such as scooters, which do not have a fuel tank in front of the seat, the airbag apparatus adapted to be disposed between the fuel tank and the seat cannot be applied as is as in the case of the related art. Thus, it cannot be said that it is superior in versatility.

SUMMARY AND OBJECTS OF THE INVENTION

In view of such circumstances, an object of the present invention is to provide an airbag apparatus for a compact vehicle, in which the connection between the inflator and the airbag may be simplified while enabling simplification of the configuration of the airbag.

In order to achieve the object described above, the present invention provides a compact vehicle including a pipe stem to be inserted into a head pipe and rotatably supported by the head pipe and located at the front end on a vehicle body frame. A front fork is provided for rotatably supporting a front wheel being connected to a top bridge and a bottom bridge secured at the upper and lower ends of the pipe stem projected from the upper and lower ends of the aforementioned head pipe. A steering handle is mounted on the aforementioned top bridge and the airbag is supported on the aforementioned top bridge or on the aforementioned steering handle. An inflator for supplying gas for inflation and deployment into the air bag is stored in the aforementioned pipe stem.

According to the structure described above, since the airbag is supported on the top bridge or on the steering handle, there is no obstacle in the direction of inflation and deployment when the airbag is inflated and deployed for restraining the operator behind the steering handle, whereby the configuration of the airbag may be simplified and the flexibility of the parts for arrangement around the steering handle may be increased. In addition, the inflator is stored in the pipe stem and the inflator may be arranged by effectively utilizing the space in the pipe stem. Furthermore, the pipe stem rotates integrally with the top bridge or with the steering handle. Thus, the structure of connection between the airbag and the inflator may be simplified.

In addition, according to the construction of the present invention the aforementioned airbag in the folded state is disposed along the aforementioned steering handle and stored in the handle cover for covering the steering handle. In this arrangement, the space for arranging the airbag in the folded state may be secured around the steering handle without a problem and the inflation and deployment of the airbag may be facilitated. Further, a specific cover for storing the airbag is not necessary, which contributes to reduction in the number of components.

In addition according to the present invention the aforementioned airbag is supported on the steering handle at a plurality of points spaced longitudinally with respect to the aforementioned steering handle. In this arrangement, the stability of the airbag in lateral direction of the compact vehicle is increased during inflation and deployment of the airbag, so that the restraining capability of the airbag for the operator may be improved.

In another embodiment, it is an object of the present invention to provide an airbag apparatus for a compact vehicle, which enables upsizing of a fuel tank if the fuel tank is located in front of the seat, and hence to enhance versatility by enabling an easy application to various compact vehicles.

In order to achieve the object described above, the present invention includes a compact vehicle including a pipe stem to be inserted into a head pipe and being rotatably supported by the head pipe located at the front end on a vehicle body frame. A front fork is provided for rotatably supporting a front wheel being connected to a top bridge and a bottom bridge secured at the upper and lower ends of the pipe stem so as to project from the upper and lower ends of the aforementioned head pipe. A steering handle is mounted on the top bridge at the position keeping out of the upper end of the aforementioned pipe stem. An airbag module including an airbag is inflatable and deployable upwardly from the opening at the upper end of the pipe stem. An inflator for supplying gas to the airbag in a state in which the aforementioned airbag is folded is contained in the aforementioned pipe stem having an opened top and hermetically closed bottom.

According to the structure described above, since the airbag module is stored in the pipe stem being relatively small in diameter, it is easy to close the upper end of the pipe stem in a liquid-tight manner, so that the liquid-tight property is maintained when the inflator is not actuated, and the liquid-tight property is released as the airbag is inflated and deployed. Therefore, its antiweatherability may easily be enhanced. In addition, since the space for installing the airbag module does not affect on the capacity of the fuel tank in the case where the fuel tank is located in front of the seat, the fuel tank may be upsized, and it may easily be applied to various types of compact vehicles having a structure in which the pipe stem is rotatably supported by the head pipe. Therefore, the general-purpose properties may be enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will now be described based on an embodiment of the present invention shown in the attached drawings.

Figure 1:
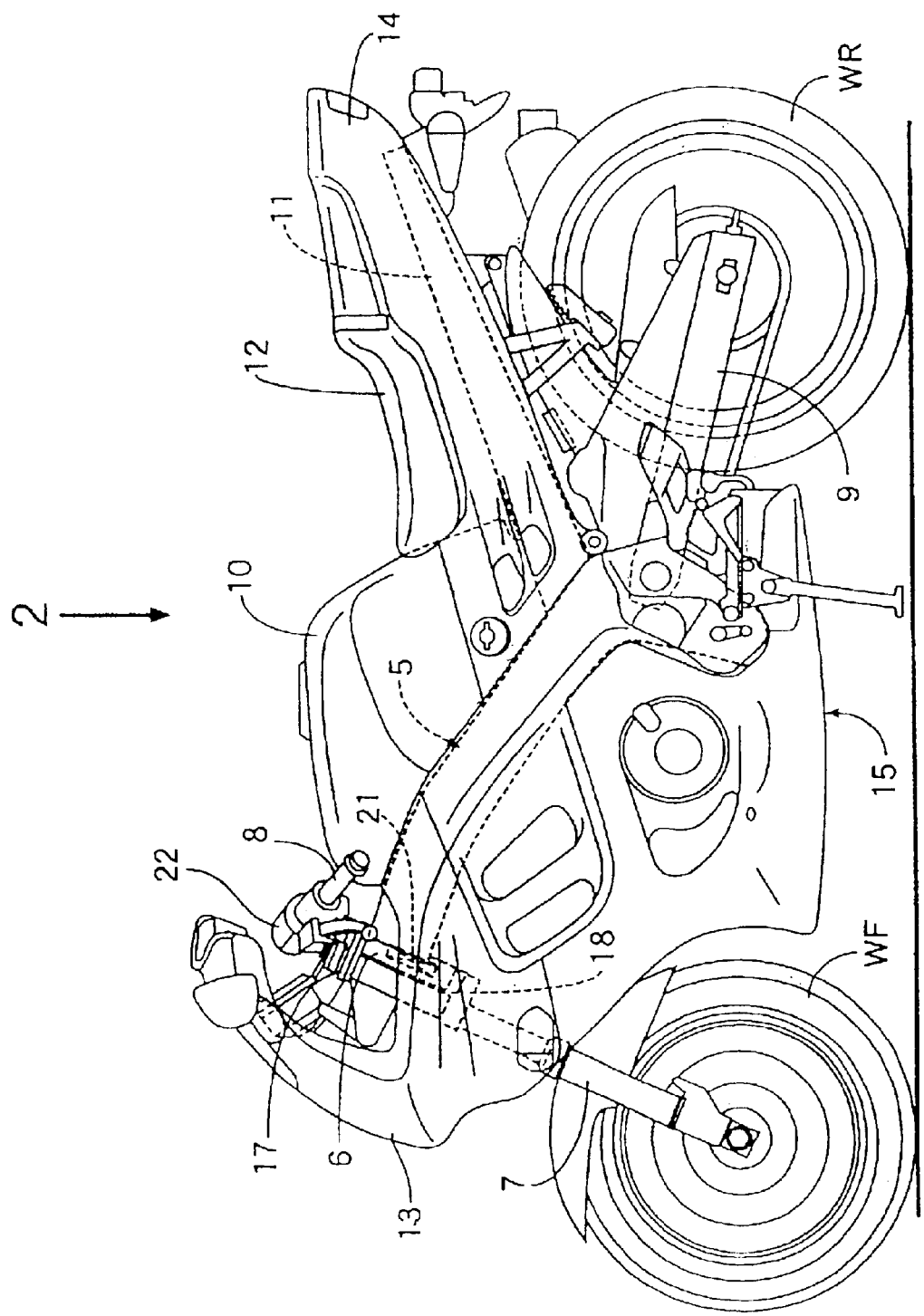
FIG. 1 is a side view of a motorcycle.
Figure 2:
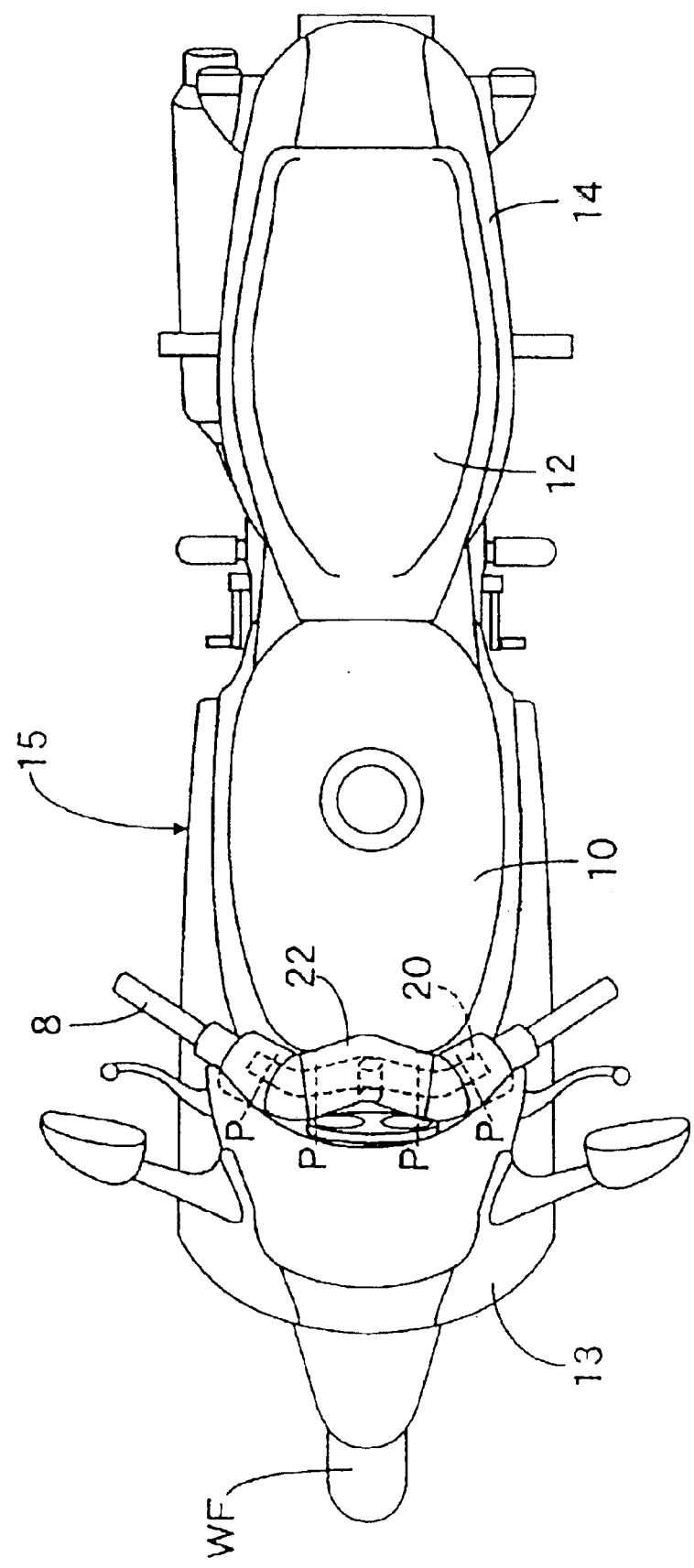
FIG. 2 is a plan view shown in the direction indicated by the arrow 2 in FIG. 1.

Referring now to FIG. 1 and FIG. 2, a front fork 7 is steerably supported on a head pipe 6 provided at the front end of a vehicle body frame 5 of the motorcycle, and a front wheel WF is rotatably supported at the lower end of the front fork 7. A swing arm 9 is supported at the rear of the vehicle body frame so as to be capable of swinging in the vertical direction. A rear wheel WR is supported at the rear end of the swing arm 9.

A fuel tank 10 is mounted on the front half portion of the vehicle body frame 5, and a tandem seat 12 disposed behind the aforementioned fuel tank 10 and is mounted on a seat rail 11 provided on the rear portion of the vehicle body frame 5.

Most parts of the vehicle body frame 5 are covered by a vehicle body cover 15 made of a synthetic resin and including a front cowl 13 and a rear cowl 14.

Figure 3:
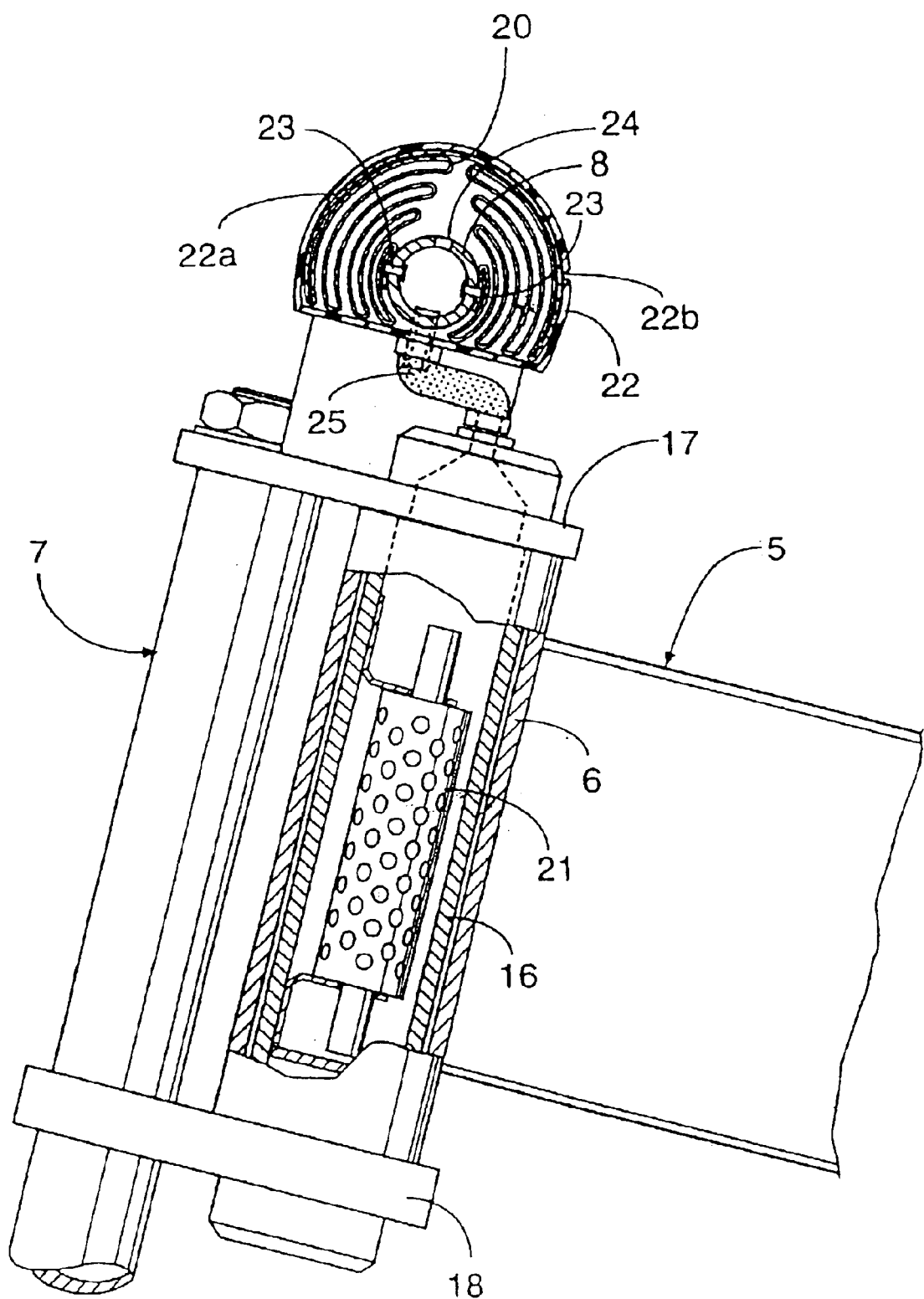
FIG. 3 is an enlarged vertical cross section of an airbag apparatus in the non-working state.
Figure 4:
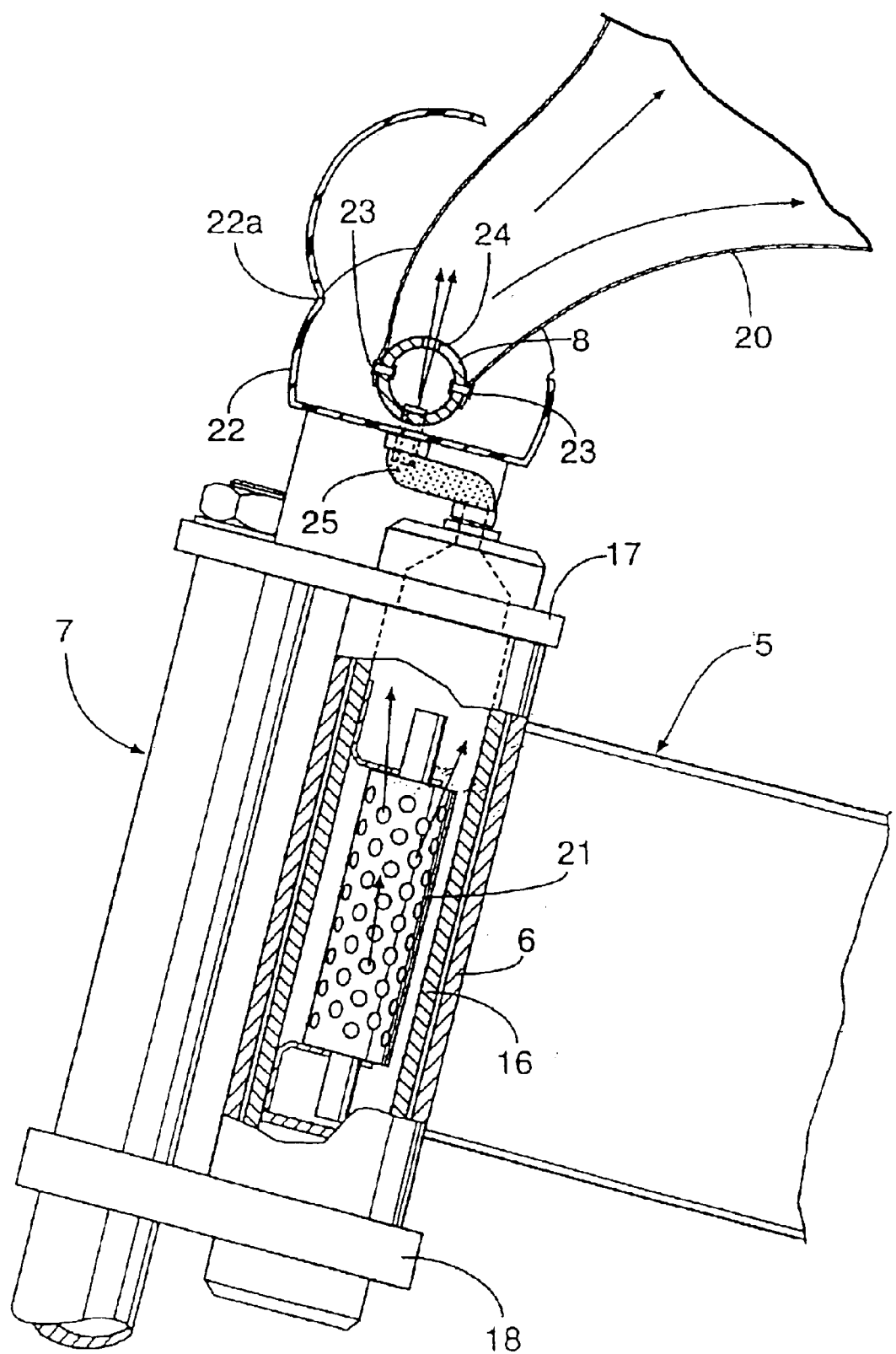
FIG. 4 is a vertical cross section corresponding to FIG. 3, showing a state in which an airbag is inflated and deployed.
Figure 5:
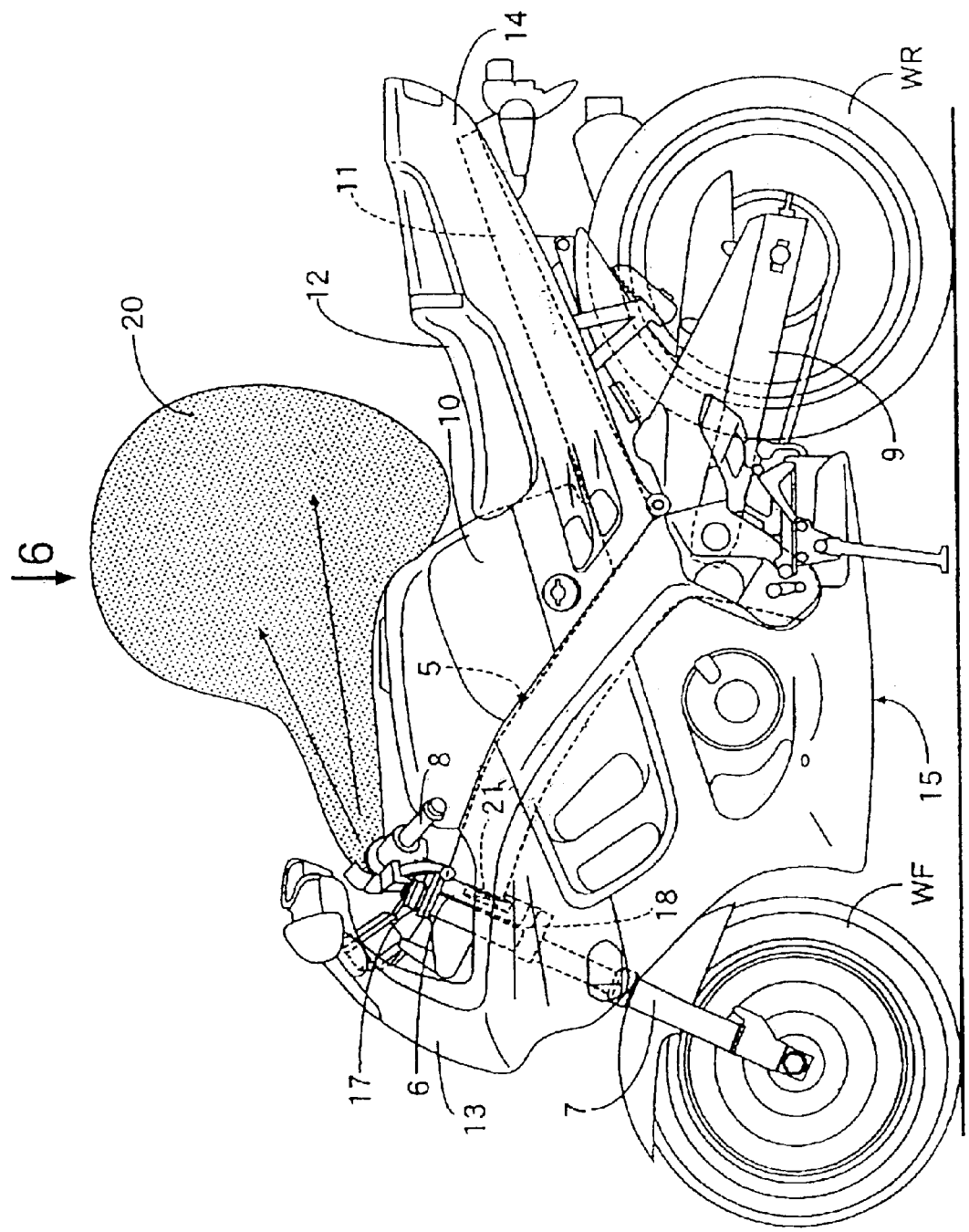
FIG. 5 is a side view corresponding to FIG. 1, in a state in which the airbag is inflated and deployed.
Figure 6:
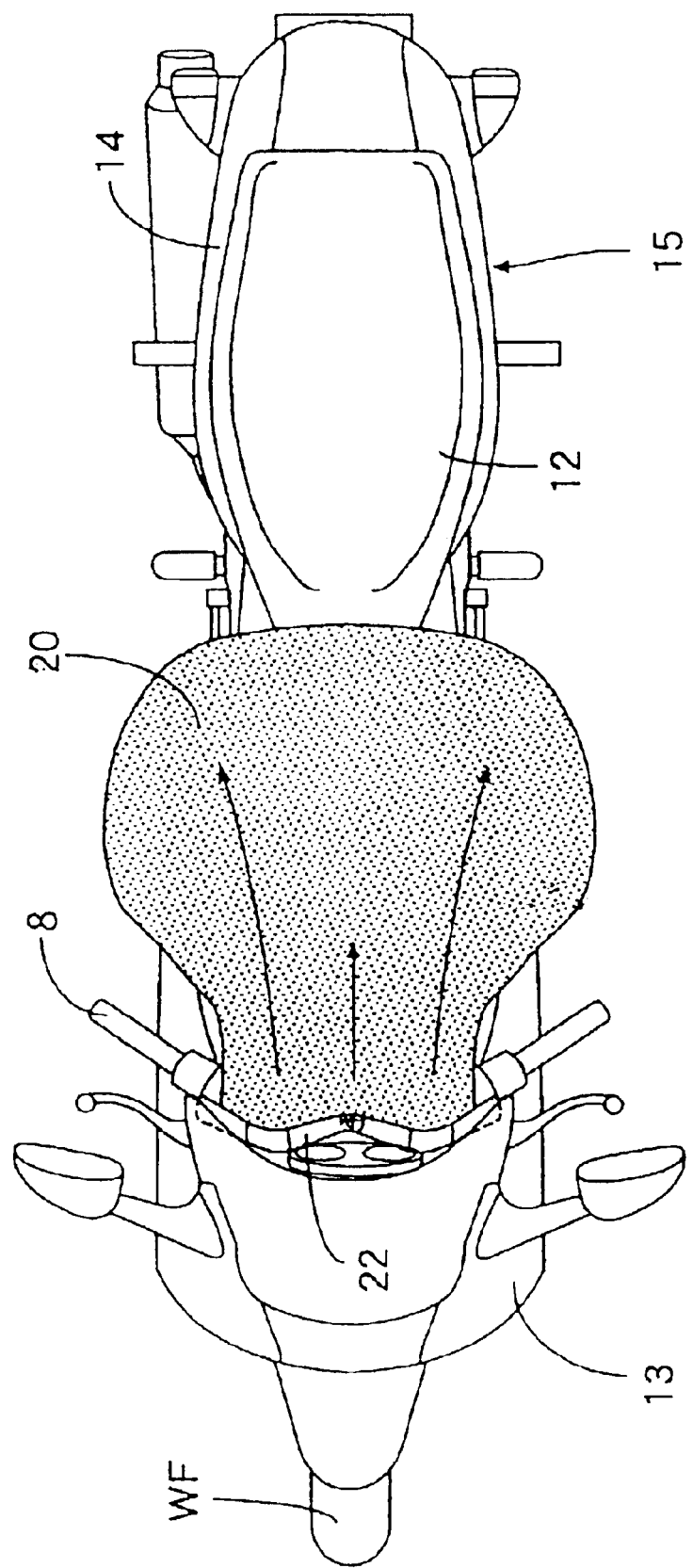
FIG. 6 is a plan view seen in the direction indicated by an arrow 6 in FIG.

In FIG. 3, a pipe stem 16 adapted to be inserted into the head pipe 6 is rotatably supported by the head pipe 6. The front fork 7 is connected to a top bridge 17 and a bottom bridge 18 is secured at the upper and lower ends of the pipe stem 16 and projects from the upper and lower ends of the head pipe 6. A pair of left and right steering handles 8, 8 are mounted on the top bridge 17 at a position to be kept out of the upper end of the pipe stem 16.

An airbag 20 is supported on the top bridge 17 or by the steering handle 18, in this embodiment, by the steering handle 18, and an inflator 21 for supplying gas for inflation and deployment to the airbag 20 is stored in the pipe stem 16.

The longitudinal midsection of the steering handle 18 is covered by a handle cover 22 formed of synthetic resin. The aforementioned airbag 20 in the folded state is disposed along the aforementioned steering handle 18 and is stored in the aforementioned handle cover 22.

The handle cover 22 is formed into a cylindrical shape for covering the steering handle 18, and a hinged portion 22a is formed so as to extend longitudinally with respect to the steering handle 18 at the front of the handle cover 22. A weakened portion 22b that may be easily broken is formed so as to extend longitudinally with respect to the steering handle 18 at the rear of the handle cover 22.

The opening of the airbag 20 is fixedly supported on the steering handle 8 at a plurality of fixing points P, P . . . (See FIG. 2) spaced longitudinally with respect to the steering handle 8 with rivets 23 . . . or the like. The steering handle 8, being cylindrical shape, is hermetically closed at both ends, and is formed with a communication hole 24 in communication with the aforementioned airbag 20.

On the other hand, the upper and lower ends of the pipe stem 16 for storing the inflator 21 are also hermetically closed, and an end of a conduit 25 for conducting gas generated in the pipe stem 16 in association with the actuation of the inflator 21 is connected to the upper end of the pipe stem 16 so as to communicate with the interior thereof. The other end of the conduit 25 is connected to the steering handle 8. In other words, the inflator 21 and the airbag 20 are connected with each other via the pipe stem 16, the conduit 25 and the steering handle 8.

An impact detection sensor (not shown) such as an acceleration sensor or the like is mounted on the vehicle body frame 5, and the aforementioned inflator 21 is actuated upon detection of the impact not less than a predetermined value by the impact detection sensor to supply high-pressure gas into the airbag 20.

The operation of the present embodiment will now be described. Since the airbag 20 is supported on the steering handle 8, there is no obstacle in the direction of inflation and deployment when the airbag 20 is inflated and deployed for restraining the operator behind the steering handle 8. Thus, the configuration of the airbag 20 may be simplified, and the flexibility of parts arrangement around the steering handle 8 may be increased.

Since the inflator 21 for supplying gas for inflation and deployment into the airbag 20 is stored in the pipe stem 16, the inflator 21 may be disposed by effectively utilizing the space in the pipe stem 16. In addition, since the pipe stem 16 rotates integrally with the steering handle 8, the structure of connection between the airbag 20 and the inflator 21 may be simplified.

Since the airbag 20 in the folded state is disposed along the steering handle 8 and stored in the handle cover 22 for covering the steering handle 8, the space for arranging the airbag 20 in the folded state may be secured around the steering handle 8 without a problem and the inflation and deployment of the airbag 20 may be facilitated. In addition, a specific cover for storing the airbag 20: is not necessary, which contributes to the reduction in the number of components.

Since the airbag is supported on the steering handle 8 at a plurality of points spaced longitudinally with respect to the steering handle 8, the stability of the airbag 20 in lateral direction of the motorcycle may be increased during inflation and deployment of the airbag 20, so that the restraining capability of the airbag 20 for the operator may be improved.

Figure 8:
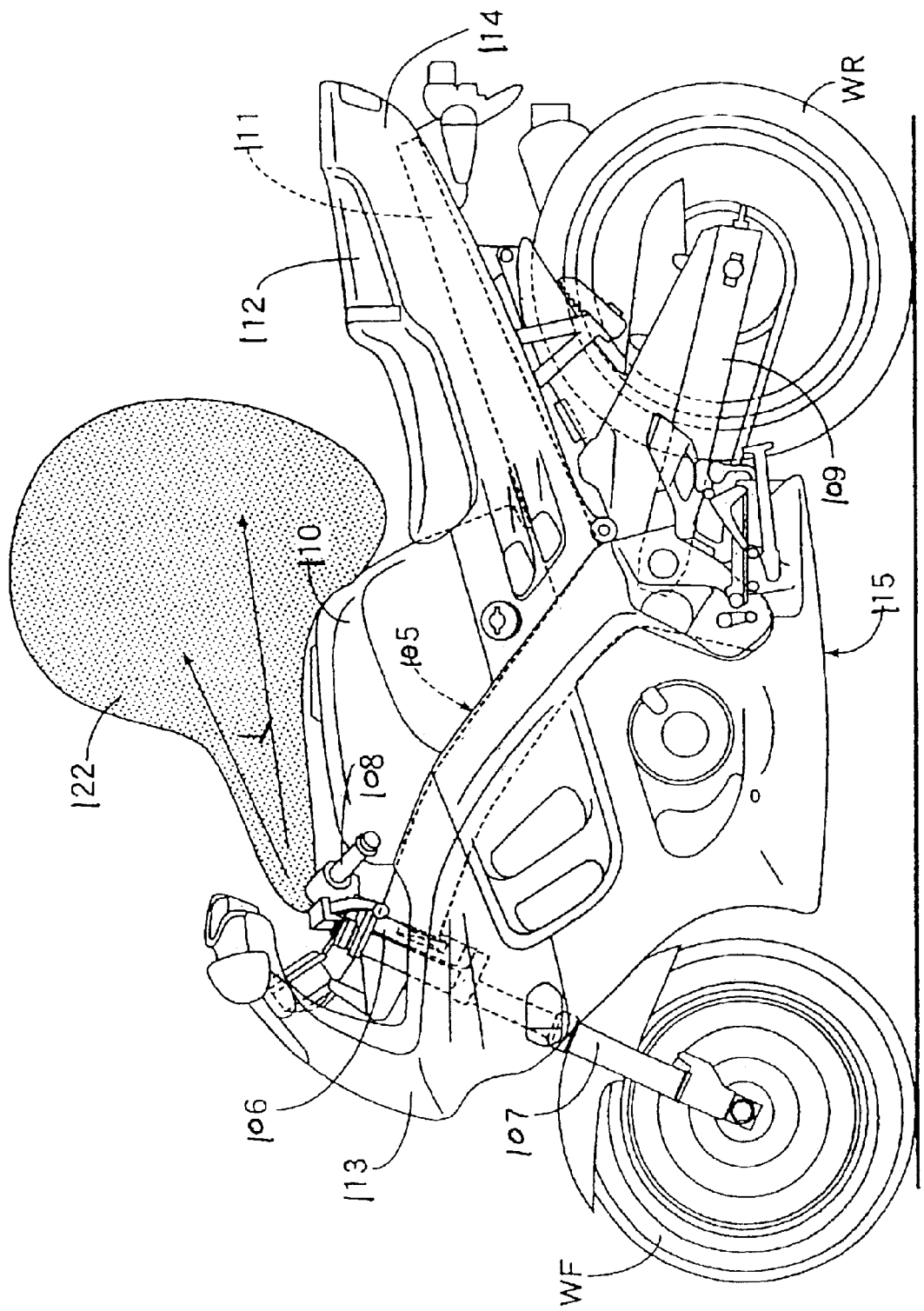
FIG. 8 is a side view similar to FIG. 1, showing a state in which an airbag according to a second embodiment is inflated and deployed.

Referring now to FIG. 8, a front fork 107 is steerably supported on a head pipe 106 provided at the front end of a vehicle body frame 105 of the motorcycle, and a front wheel WF is rotatably supported at the lower end of the front fork 107. A swing arm 109 is supported at the rear of the vehicle body frame so as to be capable of swinging in the vertical direction. A rear wheel WR is supported at the rear end of the swing arm 109.

A fuel tank 110 is mounted on the front half portion of the vehicle body frame 105, and a tandem seat 112 disposed behind the aforementioned fuel tank 110 and is mounted on a seat rail 111 provided on the rear portion of the vehicle body frame 105.

Most parts of the vehicle body frame 105 are covered by a vehicle body cover 115 made of a synthetic resin and including a front cowl 113 and a rear cowl 114.

Figure 7:
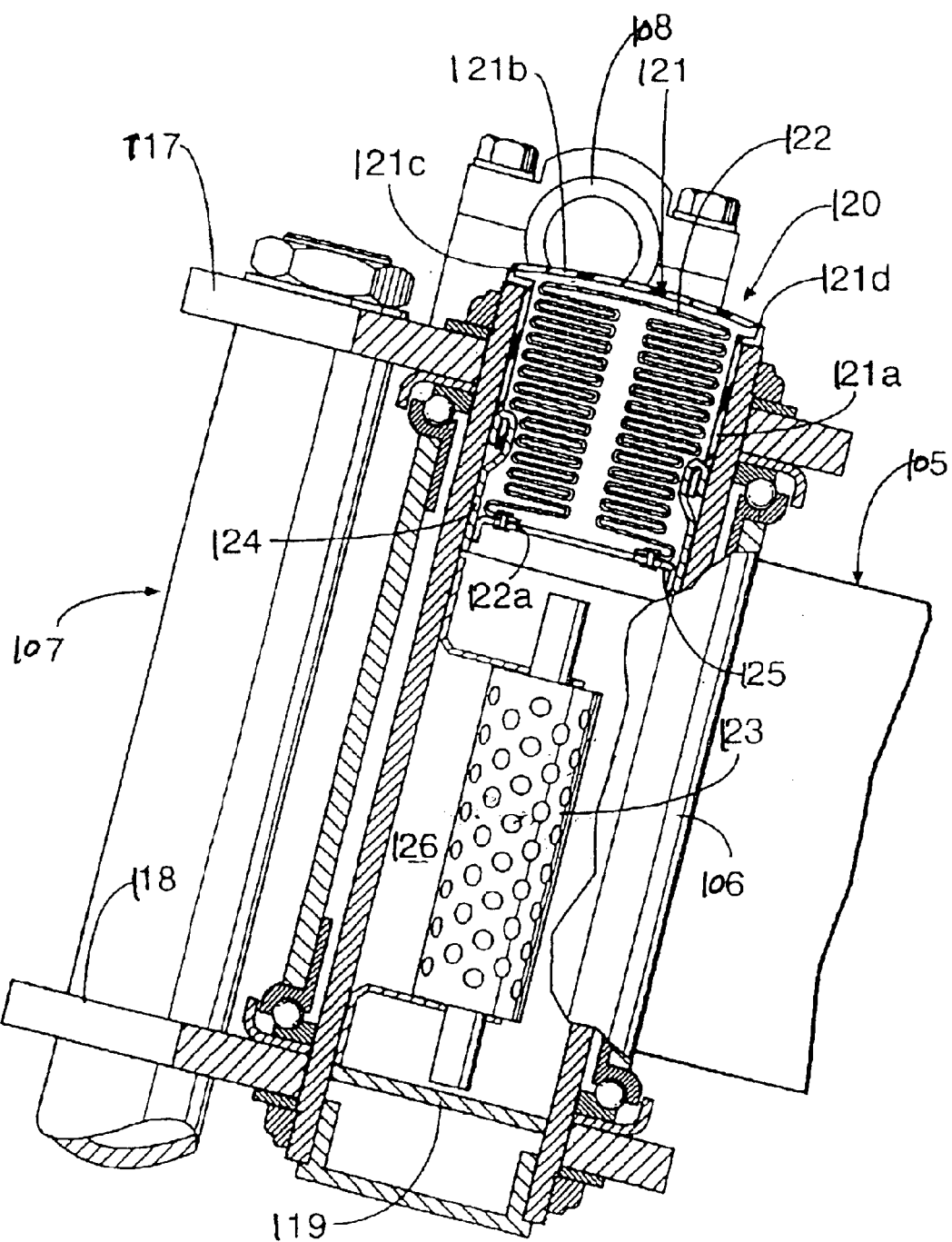
FIG. 7 is an enlarged vertical cross section of an airbag module according to a second embodiment in the non-working state.

In FIG. 7, a pipe stem adapted to be inserted into the head pipe 106 is rotatably supported by the head pipe 106. The front fork 107 is connected to a top bridge 117 and a bottom bridge 118 is secured at the upper and lower ends of the pipe stem 116 and projects from the upper and lower ends of the head pipe 106. A pair of left and right steering handles 108, 108 are mounted on the top bridge 117 at a position to be kept out of the upper end of the pipe stem 116.

Figure 9:
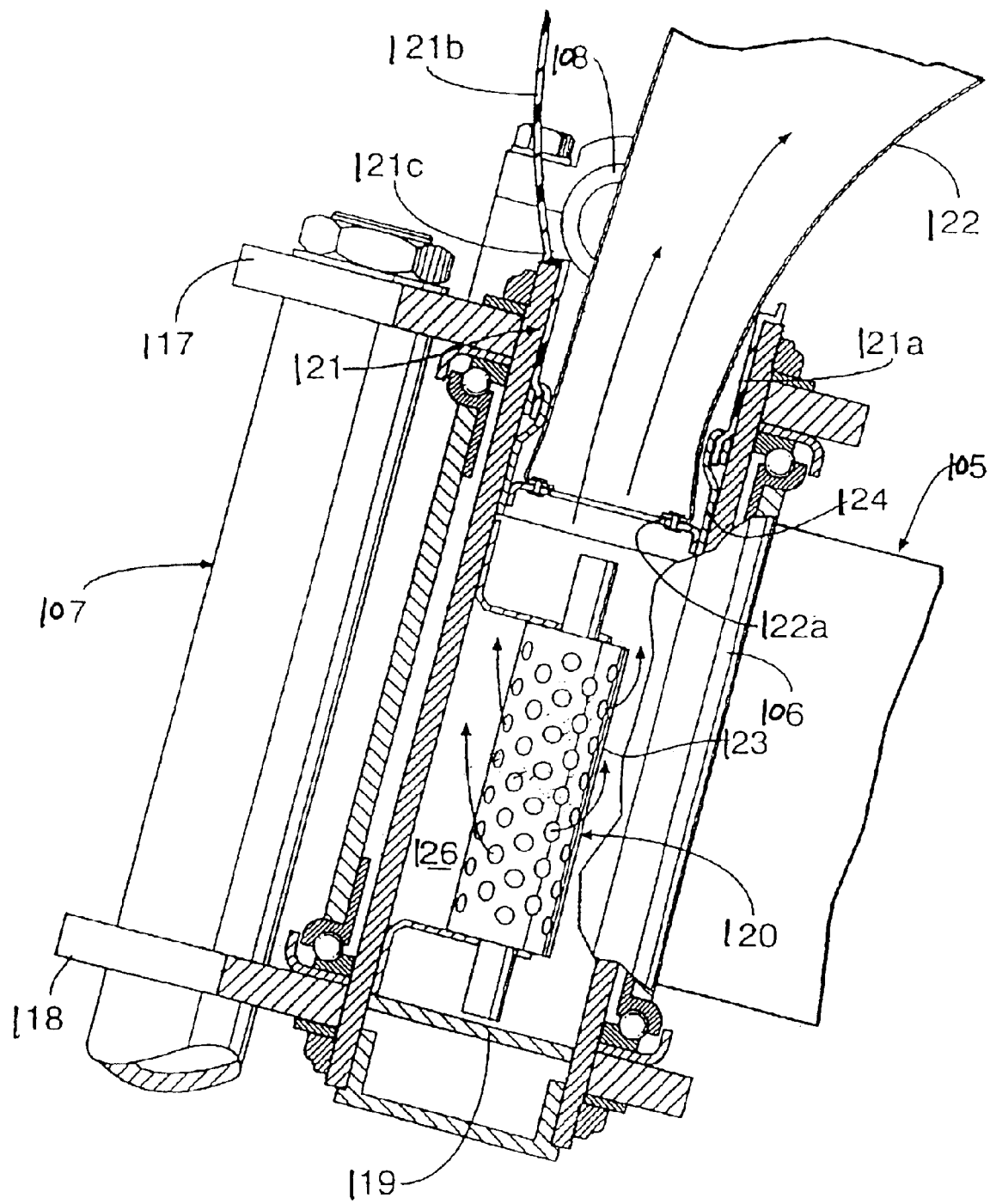
FIG. 9 is a vertical cross-sectional view corresponding to FIG. 7, in a state in which the airbag is inflated and deployed.

As illustrated in FIGS. 7–9, an airbag module 120 of the airbag apparatus is stored in the pipe stem 116, which is opened on top and hermetically closed by a closing plate 119 at the bottom. The airbag module 120 includes an airbag housing 121, an airbag 122 to be stored in the airbag housing 121, and an inflator 123 for generating gas for inflating and deploying the airbag 122.

The airbag housing 121 includes a storage cylinder 121a wherein the airbag 122 may be stored in the folded state and a lid portion 121b for closing the upper end opening of the storage cylinder 121a. The lid portion 121b is formed of light material such as synthetic resin into a cap-shape. The storage cylinder 121a is fitted into the pipe stem 16 in such a manner that the lid portion 121b projects upwardly from the upper end opening of the pipe stem 116. The lower end opening of the storage cylinder 121a is fitted hermetically into the pipe stem 116, and is mounted on a cylindrical mounting member 124 secured on the pipe stem 116.

The lid portion 121b is connected to the storage cylinder 121a via a hinged portion 121c disposed at one point around the lid portion 121b, for example, at one point on the opposite side from the fuel tank 110, and a weakened portion 121d to be disposed at the position around the lid portion 121b except for the aforementioned hinged portion 121c. The weakened portion 121d is formed so as to be easily broken.

The airbag 122 includes an opening 122a at the lower surface, is formed in a bag shape, and stored in the airbag housing 121 in the folded state. The inflator 123 is hermetically connected to a mouthpiece 125 attached to the opening 122a on the lower surface of the aforementioned airbag 122. The mouthpiece 125 is fixed to the inner surface of the aforementioned mounting member 124.

A storage chamber 126 formed in the pipe stem 116 between the mouthpiece 125 and the closing plate 119 hermetically communicates with the airbag 122. The inflator 123 is mounted on the inner surface of the pipe stem 116 so as to be stored in the storage chamber 126.

An impact detection sensor (not shown) such as an acceleration sensor and the like is mounted on the vehicle body frame 105, and the aforementioned inflator 123 is actuated upon detection of an impact not less than a predetermined value by the impact detection sensor to supply high-pressure gas into the airbag 122.

The operation of the present embodiment will now be described. Since the airbag module 120 including the airbag 122 being inflatable and deployable upwardly from the upper end opening of the pipe stem 116 and the inflator 123 for supplying gas to the airbag 122 is stored in the pipe stem 116 being opened on top and hermetically closed at the bottom in a state in which the airbag 122 is folded, when the impact detection sensor detects an impact not less than a predetermined value in case of collision or the like, the inflator 123 is actuated and supplies high-pressure gas into the airbag 122. The airbag 122 is then inflated upwardly instantaneously while breaking the weakened portion 121d of the airbag housing 121 and opening the lid portion 121b, as shown in FIG. 8 and FIG. 9. Accordingly, the rider on the seat 112 is blocked from the front by the inflated and deployed airbag 122. Thus, an impact applied to the rider is alleviated.

Since the airbag module 120 is stored in the pipe stem 116 which is relatively small in diameter, it is easy to close the upper end of the pipe stem 116 in a liquid-tight manner so that the liquid-tight property is maintained in a state in which the inflator 123 is not actuated and the liquid-tight property is released as the airbag 122 is inflated and deployed. Therefore, its antiweatherability may easily be enhanced.

In addition, since the space for installing the airbag module 120 does not affect on the capacity of the fuel tank 110, the tank 110 may be upsized.

Generally, in the compact vehicle, the pipe stem 116 is rotatably supported by the head pipe 106, and thus the storage structure of the airbag module 120 may be applied easily to various types of compact vehicles. Thus, the general-purpose properties may be enhanced.

Although an embodiment of the present invention has been described thus far, the present invention is not limited to the aforementioned embodiment, and various modifications in design may be made without departing from the scope of the present invention stated in claims.

For example, the airbag may be adapted to be mounted on the top bridge.

The present invention is applicable not only to the motorcycle described in the above-described embodiment, but widely to compact vehicles such as a scooter type motorcycle, a three-wheeler, and the like.

As described above, according to the present invention the configuration of the airbag may be simplified and the flexibility of parts arrangement around the steering handle may be increased. Therefore, the inflator may be disposed by effectively utilizing the space in the pipe stem and thus the structure of the connection between the airbag and the inflator may be simplified.

According to the present invention, the space for disposing the airbag in the folded state may be secured around the steering handle without a problem, and the inflation and deployment of the airbag may be facilitated. In addition, a specific cover for storing the airbag is not necessary, which contributes to reduction of the number of components.

According to the present invention, the stability of the airbag in a lateral direction of the compact vehicle is increased during inflation and deployment of the airbag, so that retraining capability of the airbag for the operator may be improved.

According to the second embodiment of the present invention, by storing the airbag module in the pipe stem which is relatively small in diameter, the antiweatherability may easily be enhanced, and simultaneously, the general-purpose property may be enhanced by making it easily applicable to various types of compact vehicles, whereby upsizing of the fuel tank may be possible even when the fuel tank is located in the front of the seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a compact vehicle including a pipe stem to be inserted into a head pipe being rotatably supported by the head pipe located at the front end on a vehicle body frame, a front fork for rotatably supporting a front wheel (WF) being connected to a top bridge and a bottom bridge secured at the upper and lower ends of the pipe stem projected from the upper and lower ends of said head pipe, and a steering handle mounted on said top bridge, an airbag apparatus for a compact vehicle comprising:

an airbag supported on said top bridge or said steering handle; and an inflator for supplying gas for inflation and deployment into the airbag, said inflator being stored in said pipe stem.

2. The airbag apparatus for a compact vehicle according to claim 1, wherein said airbag in the folded state is disposed along said steering handle and stored in a handle cover for covering the steering handle.

3. The airbag apparatus for a compact vehicle according to claim 1, wherein said airbag is supported on the steering handle at a plurality of points spaced longitudinally with respect to said steering handle.

4. The airbag apparatus for a compact vehicle according to claim 2, wherein said airbag is supported on the steering handle at a plurality of points spaced longitudinally with respect to said steering handle.

5. The airbag apparatus for a compact vehicle according to claim 1, and further including a conduit for operatively connecting the inflator to the steering handle for supplying high-pressure gas to the airbag.

6. The airbag apparatus for a compact vehicle according to claim 5, and further including a communication hole formed in said steering handle for communicating the high-pressure gas supplied from the inflator and to the conduit to the communication hole and thereafter to the airbag.

7. The airbag apparatus for a compact vehicle according to claim 1, and further including an impact detection sensor for actuating of the inflator upon detection of an impact greater than a predetermined value.

8. The airbag apparatus for a compact vehicle according to claim 7, wherein said impact detection sensor is an acceleration sensor.

9. In a compact vehicle including a pipe stem to be inserted into a head pipe being rotatably supported by the head pipe located at the front end on a vehicle body frame, a front fork for rotatably supporting a front wheel (WF) being connected to a top bridge and a bottom bridge secured at the upper and lower ends of the pipe stem projecting from the upper and lower ends of said head pipe, and a steering handle mounted on said top bridge at the position keeping out of the upper end of said pipe stem, an airbag apparatus for a compact vehicle comprising:

said pipe stem having an opened top and hermetically closed bottom for containing an airbag module, said airbag module including:

an airbag being inflatable and deployable upwardly from the opening at the upper end of the pipe stem; and an inflator for supplying gas to the airbag in a state in which said airbag is folded.

10. The airbag apparatus for a compact vehicle according to claim 9, wherein said airbag in the folded state is disposed along and stored in the pipe stem.

11. The airbag apparatus for a compact vehicle according to claim 9, wherein gas is supplied directly to the airbag from the inflator.

12. The airbag apparatus for a compact vehicle according to claim 9, and further including a mouth piece fixed to an inner surface of a mounting member disposed adjacent to the inflator for communicating the high-pressure gas supplied from the inflator and to the airbag.

13. The airbag apparatus for a compact vehicle according to claim 9, and further including an impact detection sensor for actuating of the inflator upon detection of an impact greater than a predetermined value.

14. The airbag apparatus for a compact vehicle according to claim 13, wherein said impact detection sensor is an acceleration sensor.

15. The airbag apparatus for a compact vehicle according to claim 9, and further including portion for closing an upper end opening of the pipe stem during non-use of the airbag.

* * * * *